Patented Sept. 2, 1924.

1,507,554

UNITED STATES PATENT OFFICE.

JOHN J. COOPER, OF STAMFORD, CONNECTICUT.

EXERCISING APPARATUS.

Application filed April 11, 1921. Serial No. 460,207.

*To all whom it may concern:*

Be it known that I, JOHN J. COOPER, a citizen of the United States, and a resident of Stamford, in the county of Fairfield and State of Connecticut, have invented a new and Improved Exercising Apparatus, of which the following is a full, clear, and exact description.

The object of the invention is to provide a new and improved exercising apparatus more especially designed to induce muscular action of the abdomen, legs, shoulders, neck and back of the body with a view to improve the physical condition of the user. Another object is to imitate horseback riding.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1:
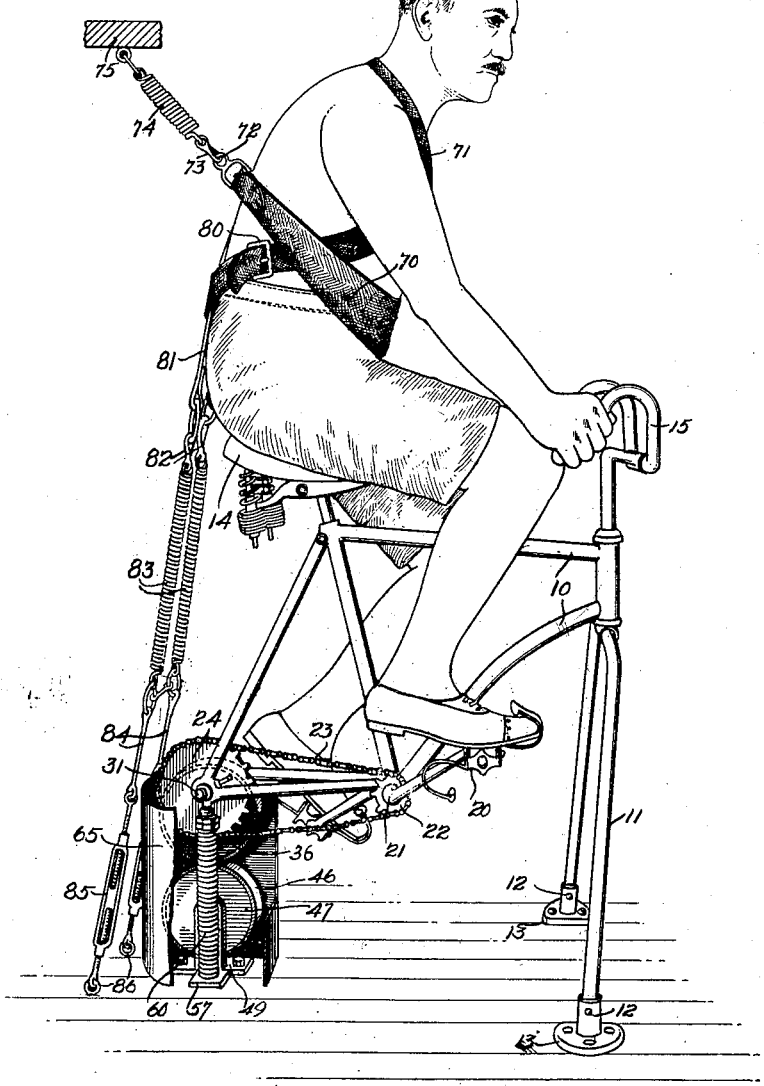
Figure 1 is a perspective view of the improved exercising apparatus in use and with part of the protective covering shown broken out.

The frame 10 of the exercising apparatus is similar to a bicycle frame and is provided with a front fork 11 pivotally connected at the lower ends of its side members by pivots 12 with brackets 13 attached to a floor or other support. The rear upper end of the frame 10 is provided with an adjustable saddle 14 of usual construction for supporting the user having hold of a fixed handle bar 15 mounted on the front end of the frame 10 above fork 11. The feet of the user engage and actuate a pedal mechanism 20 of any approved construction and having its crank shaft 21 journaled in the lower portion of the frame 10. On the crank shaft 21 is secured a sprocket wheel 22 connected by a sprocket chain 23 with a sprocket wheel 24 secured on an axle 25 mounted to turn on a ball bearing 30 carried on a rod 31 extending centrally through the hollow axle 25. The rear lower portion of the frame 10 is mounted on the rod 31.

Figure 2:
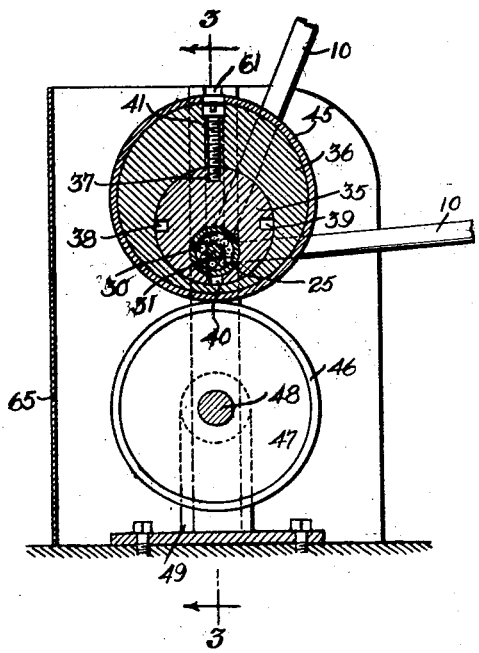
Figure 2 is an enlarged sectional side elevation of the frame actuating means for producing a rocking motion, the section being on the line 2—2 of Figure 3.
Figure 3:
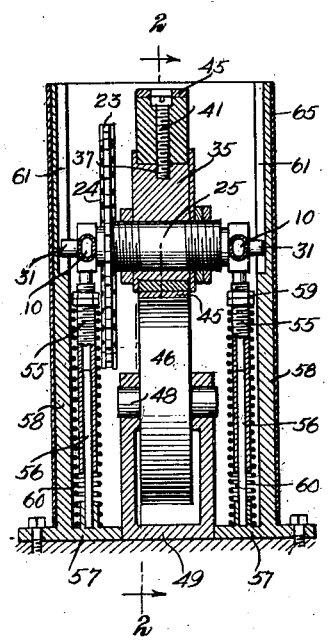
Figure 3 is a cross section of the same on the line 3—3 of Figure 2.
Figure 4:
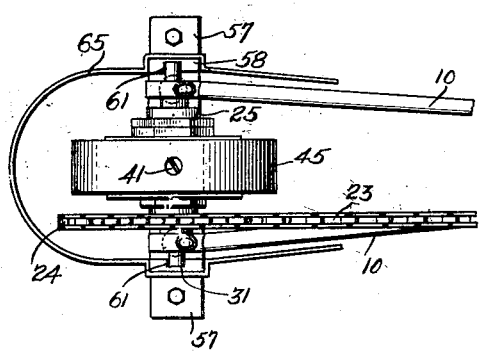
Figure 4 is a plan view of the same with the rear brace of the frame shown in section.

The frame 10 is given an up and down and a forward and backward rocking motion, and for this purpose use is made of actuating means controlled by the user on turning the pedals 20 and imparting a rotary motion to the axle 25. This actuating mechanism is constructed as follows: On the axle 25 is secured eccentrically the hub 35 of an eccentric having an eccentric body 36 adjustably mounted on the hub 35. The peripheral face of the hub 35 is for this purpose provided with spaced recesses 37, 38, 39 and 40, any one of which is adapted to be engaged by a screw 41 screwing in the eccentric body 36, as plainly shown in Figures 2 and 3. It will be noticed that by retracting the screw 41 the eccentric body 36 can be turned on the hub 35 to vary the throw of the eccentric, the construction being such that when the screw 41 engages the recess 40 then the center of the eccentric body 36 coincides with the axis of the axle 25 and hence the eccentric becomes concentric relative to the axle 25. As shown in Figure 2, the screw 41 engages the recess 37 and hence the eccentric is adjusted to its maximum throw relative to the axle 25. Less throw can be given to the eccentric by engaging the screw 41 with either of the recesses 38 or 39. The eccentric body 36 is provided with a peripheral covering 45 of leather or other suitable material resting on a similar covering 46 on the peripheral face of a wheel 47 having its shaft 48 journaled in a bracket 49 attached to a floor or other support. It will be noticed that by the arrangement described the eccentric is in rolling contact with the supporting wheel 47, and when the axle 25 is turned then the eccentric on account of resting on the peripheral face of the wheel 47 is caused to impart an up and down and a forward and backward swinging movement to the frame 10 mounted to swing on the pivots 12, as previously mentioned. Thus by the arrangement described a rocking motion is given to the frame 10 and hence the user seated on the saddle 14 experiences a movement similar to that of horseback riding.

The rear lower portion of the frame 10 is provided at each side with a depending tube 55 sliding on a rod 56 supported by the base 57 of a stand 58 attached to the floor or other support, and on the upper end of the tube 55 screws a nut 59 against which abuts the upper end of a spring 60 resting at its lower end on the base 57. By the arrangement described a yielding support is provided for the rear lower end of the frame 10 to insure an easy riding of the user on the exercising apparatus. The ends of the rod 31 extend in vertical grooves 61 formed in the inner face of the stand 58 to guide the rod 31 in its up and down movement and thus cause the frame 10 to rock forward and backward besides the up and down movement given to it by the eccentric turning on the supporting wheel 47. A protecting hood 65 is attached to the stand 58 to prevent the feet of the user from becoming entangled with the rotating parts enclosed by the said hood.

In order to produce a beneficial muscular action of the abdomen, shoulders, neck and back of the user's body besides the leg action induced on manipulating the pedal mechanism 20, the following arrangement is made: Two belts or bands 70 and 71 of a suitable fabric material are provided, of which the band 70 passes around the abdomen of the user and terminates in rings 72 connected by snap fasteners 73 with springs 74 attached to an overhead support 75. The other band 71 is passed around the neck of the user, over the shoulders and under the arms and the ends are fastened together by a buckle 80 and are provided at the back with depending straps 81 each of which is connected by a snap fastener 82 with a spring 83 connected at its lower ends by links 84 with turnbuckles 85 held on rings 86 fastened to the floor or other support. It will be noticed that by the arrangement described the belts or bands 70 and 71 are yieldingly connected with fixed supports and with the body of the user and hence when the exercising machine is used as above described a kneading action is produced by the belt or band 70 on the abdomen of the user and a strong pull is exerted on the neck, shoulders and back of the user. Thus a muscular action of the abdomen, legs, shoulders, neck and back of the body of the user is induced with a view to improve the physical condition of the person using the exercising machine and manipulating the pedal mechanism as above explained.

It is understood that when the frame 10 rocks upward and forward and with it the user seated on the saddle 14 then a rearward pull is exerted by the belt or band 70 on the abdomen of the user, and when the frame 10 returns and with it the user the pressure on the abdomen is released. Thus by the repeated rocking of the frame a kneading action is produced by the belt or band 70 on the abdomen of the user. In a like manner the other belt or band 71 exerts a pull on the neck, shoulders and back of the user during the upward and forward rocking of the frame, and relaxation takes place during the return movement of the frame 10.

Proper adjustment of the belt or band 71 can be made at the turnbuckles 85 to suit the statures of differently built persons making use of the execising machine.

If desired, the exercising machine may be mounted in the open as shown, or in a cabinet such, for instance as shown and described in the Letters Patent of the United States, No. 1,365,460, granted to me on January 11, 1921.

Having thus described my invention, I claim as new and desire to secure by Letters Patent:

1. In an exercising apparatus, a movable frame adapted to be operated by a user thereon, and yieldable means adapted to engage the body of a user on the frame and having means to connect with a fixed support and adapted to restrict the user's movement with the frame.

2. In an exercising apparatus, a rocking frame adapted to be rocked by a user thereon, and yieldable means adapted to engage the body of the user on the frame and having means to connect with a fixed support and adapted to restrict the user's movement with the frame.

3. In an exercising machine, a support, a rocking frame permanently pivotally attached thereto, means imparting a rocking motion to the said frame, a strap adapted to engage the body of the user seated on the said frame, and yielding members connected with the ends of the strap and connected with fixed supports.

4. In an exercising machine, a support, a frame permanently pivotally attached thereto having a saddle for the user to sit on and mounted to swing forward and backward, pedal operated actuating means under the control of the user and adapted to impart an up and down and a forward and backward rocking motion to the said frame, and a strapping means adapted to engage the body of the user and having yielding connection with fixed means.

5. In an exercising machine, a rocking frame having a front fork pivoted on a fixed support, a saddle on the frame for supporting the user, pedal mechanism mounted on the frame and adapted to be actuated by the legs of the user, and raising and lowering means connected with and controlled by the said pedal mechanism, the said raising and lowering means engaging the rear of the frame to rock the same.

6. In an exercising machine, a rocking frame having a front fork pivoted on a fixed support, a saddle on the frame for supporting the user, pedal mechanism mounted on the frame and adapted to be actuated by the legs of the user, raising and lowering means connected with and controlled by the said pedal mechanism, the said raising and lowering means engaging the rear of the frame to rock the same, and a band adapted to engage the body of the user and provided at its ends with springs connected with fixed supports.

7. In an exercising machine, a frame provided with a front member pivoted on a fixed support, a saddle on the rear upper portion of the frame to support the user, a driving mechanism mounted on the frame and provided with pedals adapted to be engaged by the feet of the user, the said driving mechanism having a driven axle supporting the rear lower portion of the said frame, an eccentric mounted on the said axle, and a support contracted by the peripheral face of the said eccentric to support the latter.

8. In an exercising machine, a frame provided with a front member pivoted on a fixed support, a saddle on the rear upper portion of the frame to support the user, a driving mechanism mounted on the frame and provided with pedals adapted to be engaged by the feet of the user, the said driving mechanism having a driven axle supporting the rear lower portion of the said frame, an eccentric mounted on the said axle, a support contracted by the peripheral face of the said eccentric to support the latter, and vertical guiding means for the said axle.

9. In an exercising machine, a rocking frame, a driving gear mounted on the said frame and having a driven axle connected with the said frame, an eccentric secured on the said axle, and a roller journaled in a fixed support and in rolling engagement with the said eccentric.

10. In an exercising machine, a rocking frame, a driving gear mounted on the said frame and having a driven axle connected with the said frame, an eccentric secured on the said axle, a roller journaled in a fixed support and in rolling engagement with the said eccentric, a spring support for the said axle, and a guide for the said axle.

11. In an exercising machine, a rocking frame, a driving gear mounted on the said frame and having a driven axle connected with the said frame, an eccentric having a body, a hub mounted on the said axle, and means adjustably connecting the said body and hub, and a roller journaled in fixed bearings and in rolling contact with the said eccentric body.

12. In an exercising machine, a rocking frame, a driving gear mounted on the said frame and having a driven axle supporting the rear of the said frame, an eccentric hub mounted on the said axle and provided at its peripheral face with spaced recesses, an eccentric body turnable on the said hub, and a screw screwing in the said body and adapted to engage any one of the said recesses.

13. In an exercising machine, a rocking frame, a driving gear mounted on the said frame and having a driven axle supporting the rear of the said frame, an eccentric hub mounted on the said axle and provided at its peripheral face with spaced recesses, an eccentric body turnable on the said hub, a screw screwing in the said body and adapted to engage any one of the said recesses, the said axle being hollow, a rod extending through the axle and on which the latter is mounted to turn, and yielding supports for the ends of the said rod.

14. In an exercising machine, a rocking frame, a driving gear mounted on the said frame and having a driven axle supporting the rear of the said frame, an eccentric hub mounted on the said axle and provided at its peripheral face with spaced recesses, an eccentric body turnable on the said hub, a screw screwing in the said body and adapted to engage any one of the said recesses, the said axle being hollow, a rod extending through the axle and on which the latter is mounted to turn, yielding supports for the ends of the said rod, and fixed vertical guides for the ends of the said rod.

15. In an exercising machine, a frame mounted to rock up and down and forward and backward on a fixed support and adapted to support the user, actuating means adapted to be actuated by the legs of the user for imparting a rocking motion to the frame, an abdominal band passing around the user's abdomen, and springs connecting the rear ends of the band with an overhead fixed support.

16. In an exercising machine, a frame mounted to rock up and down and forward and backward on a fixed support and adapted to support the user, actuating means adapted to be actuated by the legs of the user for imparting a rocking motion to the frame, a band adapted to pass around the neck of the user over the shoulders and under the arms, and springs connected with the rear of the said band and attached to a fixed support.

17. In an exercising machine, a frame mounted to rock up and down and forward and backward on a fixed support and adapted to support the user, actuating means adapted to be actuated by the legs of the user for imparting a rocking motion to the frame, an abdominal band passing around the user's abdomen, springs connecting the rear ends of the band with an overhead fixed support, and a second band adapted to pass around the neck of the user, over the